United States Patent
Yamakawa et al.

(10) Patent No.: US 11,969,884 B2
(45) Date of Patent: Apr. 30, 2024

(54) GRIPPING MECHANISM, ASSEMBLY APPARATUS AND COMPONENT

(71) Applicant: KYOCERA Document Solutions Inc., Osaka (JP)

(72) Inventors: Tomohiko Yamakawa, Osaka (JP); Koji Izumi, Osaka (JP); Masaru Takagi, Osaka (JP); Hayato Mori, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 566 days.

(21) Appl. No.: 17/280,115

(22) PCT Filed: Aug. 20, 2019

(86) PCT No.: PCT/JP2019/032501
§ 371 (c)(1),
(2) Date: Mar. 25, 2021

(87) PCT Pub. No.: WO2020/066370
PCT Pub. Date: Apr. 2, 2020

(65) Prior Publication Data
US 2022/0024053 A1 Jan. 27, 2022

(30) Foreign Application Priority Data

Sep. 26, 2018 (JP) .................... 2018-180574
Jan. 16, 2019 (JP) .................... 2019-005174

(51) Int. Cl.
*B25J 15/00* (2006.01)
*B66C 1/48* (2006.01)

(52) U.S. Cl.
CPC ............. *B25J 15/0095* (2013.01); *B66C 1/48* (2013.01)

(58) Field of Classification Search
CPC .... B25J 15/0095; B25J 15/0038; B25J 15/00; B25J 9/1055; B23P 19/04; B66C 1/48
See application file for complete search history.

(56) References Cited

U.S. PATENT DOCUMENTS

| | | | |
|---|---|---|---|
| 1,312,926 A * | 8/1919 | Sherman | .................... B66C 1/48 |
| | | | 294/102.1 |
| 3,653,708 A * | 4/1972 | Merola | ...................... B25B 9/00 |
| | | | 294/102.1 |

(Continued)

FOREIGN PATENT DOCUMENTS

| JP | S60194493 U | 12/1985 |
|---|---|---|
| JP | H07241733 A | 9/1995 |

(Continued)

*Primary Examiner* — Seahee Hong
(74) *Attorney, Agent, or Firm* — Studebaker & Brackett PC

(57) ABSTRACT

A gripping mechanism (3) includes a gripping roller (32) and a holder (31) that houses the gripping roller (32). A gripped portion (42) of a first component (4) is gripped between an outer surface of the gripping roller (32) and an inner surface of the holder (31) through action of gravity acting on the gripping roller (32). Preferably, the gripping roller (32) includes a core (321) that is cylindrical or columnar in shape and a covering section (322) that is an elastic body covering a circumferential surface of the core (321). Preferably, the covering section (322) has a circumferential surface with a friction coefficient greater than a friction coefficient of the circumferential surface of the core (321).

8 Claims, 10 Drawing Sheets

(56) References Cited

U.S. PATENT DOCUMENTS

| | | | | |
|---|---|---|---|---|
| 3,675,782 A * | 7/1972 | Dudley | ................. | B42F 15/066 |
| | | | | 211/89.01 |
| 4,831,693 A * | 5/1989 | Veith | ................... | B42F 15/066 |
| | | | | 294/102.1 |
| 4,956,899 A * | 9/1990 | Green | ..................... | F16B 2/16 |
| | | | | 63/14.7 |
| 5,893,595 A * | 4/1999 | Corbett | ................... | B66C 1/48 |
| | | | | 294/102.1 |
| 6,715,811 B2 * | 4/2004 | Nordstrom | ............... | D06G 1/00 |
| | | | | 294/81.6 |
| 7,373,748 B2 * | 5/2008 | Pitcher | ............... | G09F 15/0018 |
| | | | | 40/658 |
| 7,614,598 B2 * | 11/2009 | Smith | .................... | B42F 9/001 |
| | | | | 248/452 |
| 9,114,959 B1 * | 8/2015 | Gallet | ....................... | B66C 1/48 |
| 2001/0056313 A1 * | 12/2001 | Osborne, Jr. | .......... | A47G 21/08 |
| | | | | 700/262 |
| 2002/0149218 A1 * | 10/2002 | Gartner | .................. | A47F 7/163 |
| | | | | 294/102.1 |

FOREIGN PATENT DOCUMENTS

| | | | |
|---|---|---|---|
| JP | 2015112662 A | 6/2015 | |
| JP | 2018001306 A | 1/2018 | |

* cited by examiner

GRIPPING MECHANISM, ASSEMBLY APPARATUS AND COMPONENT

TECHNICAL FIELD

The present invention relates to a gripping mechanism, an assembly apparatus, and a component.

BACKGROUND ART

An assembly apparatus disclosed in Patent Literature 1 includes a chuck mechanism that grips a component for the purpose of transport. The chuck mechanism is an electric gripping mechanism. Besides the above, other gripping mechanisms are known that use air suction or electric suction.

CITATION LIST

Patent Literature

[Patent Literature 1]
Japanese Patent Application Laid-Open Publication No. H7-241733

SUMMARY OF INVENTION

Technical Problem

Conventional gripping mechanisms have been powered by pneumatic energy or electrical energy, and therefore were costly and prone to failure.

The present invention has been made while taking the above circumstances into account, and has an object of providing a gripping mechanism that is low in cost and that is not prone to failure, an assembly apparatus including the gripping mechanism, and a component suitable as an object to be gripped.

Solution to Problem

A gripping mechanism according to the present invention includes a roller and a frame that houses the roller. The gripping mechanism grips an object between an outer surface of the roller and an inner surface of the frame through action of gravity acting on the roller.

An assembly apparatus according to the present invention includes the above gripping mechanism and a driving mechanism that moves the gripping mechanism relative to the object.

A component according to the present invention includes a component main body and a gripped portion that protrudes from the component main body to serve as the object to be gripped by the above gripping mechanism.

Advantageous Effects of Invention

According to the present invention, a gripping mechanism that is low in cost and that is not prone to failure, an assembly apparatus including the gripping mechanism, and a component suitable as an object to be gripped can be provided.

DESCRIPTION OF EMBODIMENTS

Figure 1:
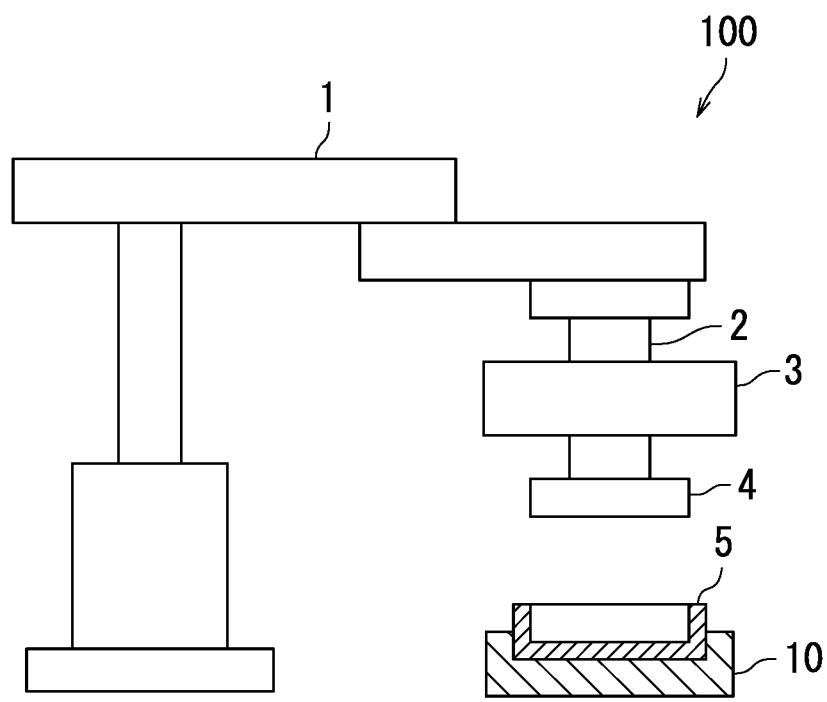
FIG. 1 is a diagram illustrating an example of an assembly apparatus according to an embodiment of the present invention.
Figure 1:
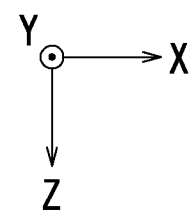
Figure 2:
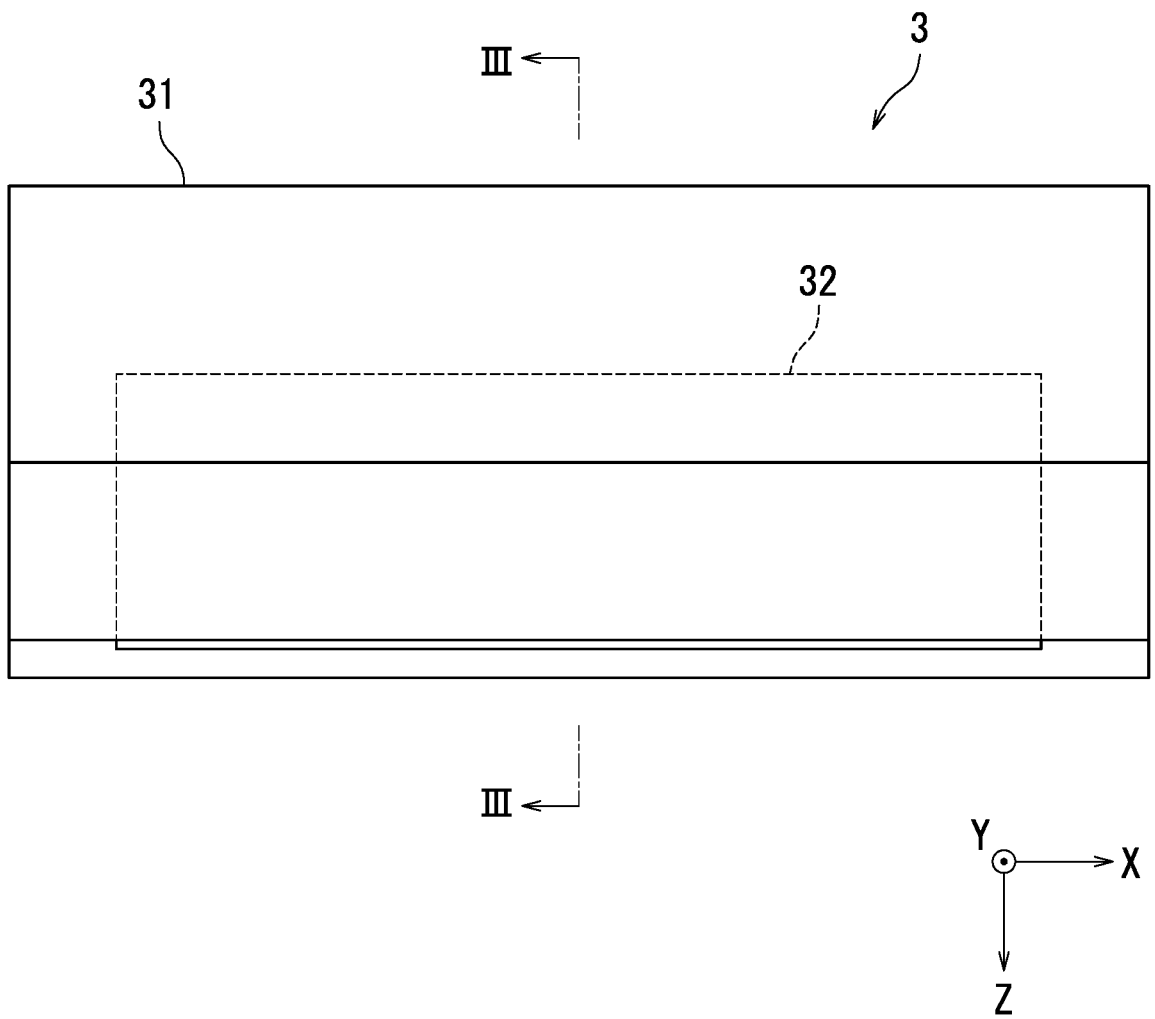
FIG. 2 is a front view of an example of a gripping mechanism according to the embodiment of the present invention.

The following describes an embodiment of the present invention with reference to FIGS. 1 to 5. In FIGS. 1 and 2, for the sake of convenience, a direction from the left to the right is referred to as a positive X-axis direction, a direction from the back to the front is referred to as a positive Y-axis direction, and a direction from up to down is referred to as a positive Z-axis direction. Note that elements that are the same or equivalent are labeled with the same reference signs in the drawings and description thereof is not repeated.

First, an assembly apparatus 100 according to the embodiment is described with reference to FIG. 1. FIG. 1 is a diagram illustrating an example of the assembly apparatus 100 according to the embodiment.

As illustrated in FIG. 1, the assembly apparatus 100 is an apparatus that assembles by fitting a first component 4 into a second component 5. The assembly apparatus 100 includes a robot 1, a position correcting device 2, and a gripping mechanism 3.

The gripping mechanism 3 grips the first component 4. The second component 5 is positioned on a position determining mechanism 10. The first component 4 is equivalent to an example of a "component".

The position correcting device 2 corrects positional shift of the first component 4 gripped by the gripping mechanism 3 relative to the second component 5. To be more specific, the position correcting device 2 detects a direction of force acting on the first component 4 in fitting of the first component 4 into the second component 5, and corrects positional shift of the first component 4 according to the direction of the force.

The robot 1 moves the gripping mechanism 3 relative to the first component 4 and also moves the gripping mechanism 3 relative to the second component 5. To be more specific, the robot 1 moves the gripping mechanism 3 to a location where the first component 4 is stored, causes the gripping mechanism 3 to grip the first component 4, and then moves the first component 4 together with the gripping mechanism 3 to a location directly above the second component 5. Thereafter, the robot 1 moves the first component 4 together with the gripping mechanism 3 in the positive Z-axis direction to fit the first component 4 into the second component 5. After accomplishment of fitting, the robot 1 causes the gripping mechanism 3 to release gripping of the first component 4 and moves the gripping mechanism 3 in a negative Z-axis direction. The robot 1 is equivalent to an example of a "driving mechanism".

Figure 3:
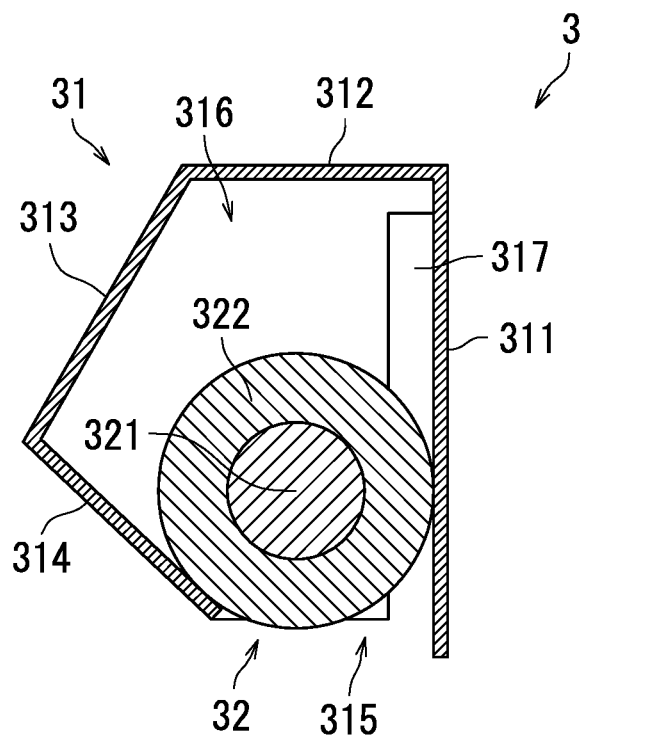
FIG. 3 is a cross-sectional view taken along the line III-III in FIG. 2.

Next, the gripping mechanism 3 according to the embodiment is described with reference to FIGS. 2 and 3. FIG. 2 is a front view of an example of the gripping mechanism 3 according to the embodiment. FIG. 3 is a cross-sectional view taken along the line III-III in FIG. 2.

As illustrated in FIG. 2, the gripping mechanism 3 includes a holder 31 and a gripping roller 32. Both of a longitudinal direction of the holder 31 and a longitudinal direction of the gripping roller 32 are an X-axis direction. The holder 31 is equivalent to an example of a "frame". The gripping roller 32 is equivalent to an example of a "roller".

As illustrated in FIG. 3, the gripping roller 32 includes a columnar core 321 and a covering section 322 that covers the circumferential surface of the core 321. For example, the core 321 is made from a metal such as iron and the covering section 322 is an elastic body made from for example polyacetal resin. The core 321 has a greater density than the covering section 322. The covering section 322 is compressively deformable. The circumferential surface of the covering section 322 has a friction coefficient greater than that of the circumferential surface of the core 321.

As illustrated in FIG. 3, the holder 31 is a frame that houses the gripping roller 32, and includes a back plate 311, a top plate 312, an upper front plate 313, a lower front plate 314, and right and left side plates 316. The holder 31 is made from a light metal such as aluminum, for example.

The back plate 311 is a rectangular plate extending along a ZX plane. The top plate 312 is a rectangular plate extending along an XY plane from an upper edge of the back plate 311 as a starting end. The upper front plate 313 is a rectangular plate extending obliquely downward in a direction away from the back plate 311 from a front edge of the top plate 312 as a starting end. The lower front plate 314 is a rectangular plate extending obliquely downward in a direction toward the back plate 311 from a lower edge of the upper front plate 313 as a starting end.

An opening 315 is defined between the back plate 311 and the lower front plate 314. The width of the opening 315 in a Y-axis direction is smaller than the diameter of the gripping roller 32. As such, the gripping roller 32 does not fall through the opening 315. The back plate 311 and the lower front plate 314 support the weight of the gripping roller 32. The lower front plate 314 is inclined relative to a Z-axis direction (vertical direction). Through the opening 315, insertion of a gripping target is received.

The back plate 311, the top plate 312, the upper front plate 313, and the lower front plate 314 define substantially pentagonal openings in the left and right side surfaces of the holder 31. The right and left side plates 316 are located so as to cover the openings. However, at least one of the side plates 316 has a cutout 317 that allows passage of the gripping target but not passage of the gripping roller 32 when gripping is released. The cutout 317 is located near the back plate 311.

By configuring the side plate 316 to be freely openable and closable for example, insertion and removal of the gripping roller 32 are enabled.

Figure 4:
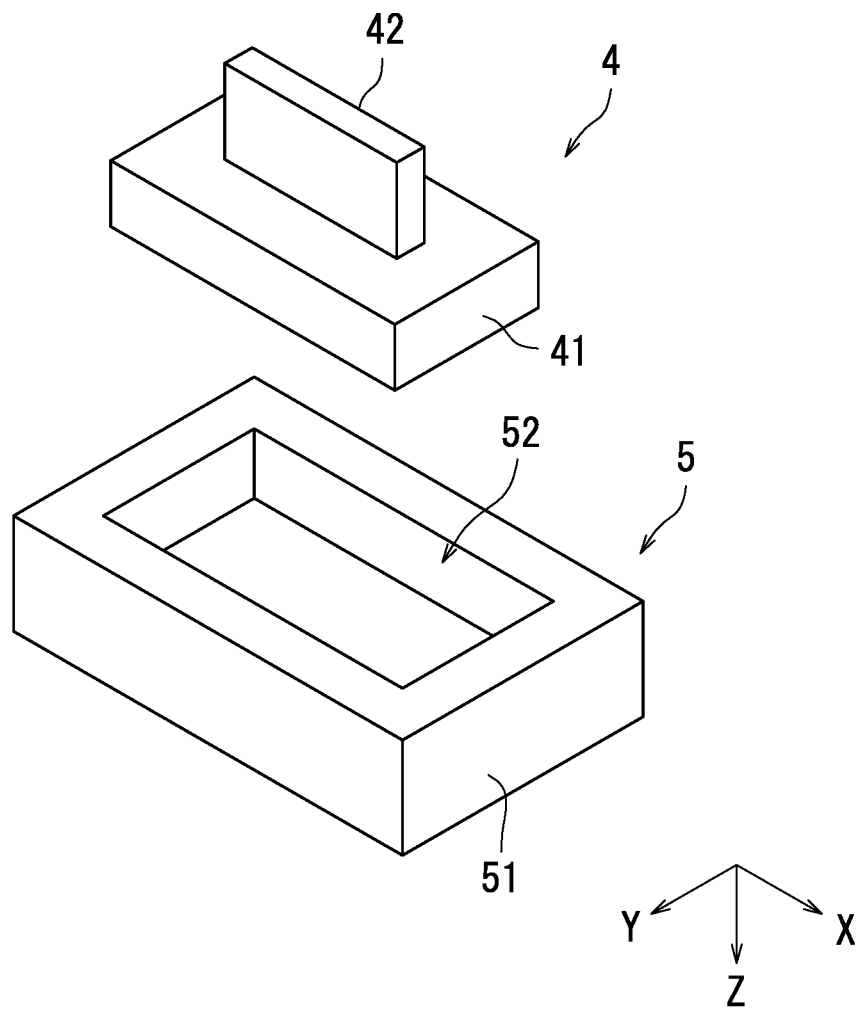
FIG. 4 is a perspective view of an example of a component according to the embodiment of the present invention.

Next, the first component 4 according to the embodiment is described with reference to FIG. 4. FIG. 4 is a perspective view of an example of the first component 4 according to the embodiment.

As illustrated in FIG. 4, the first component 4 includes a component main body 41 and a gripped portion 42. The component main body 41 has a substantially rectangular parallelepiped shape. The gripped portion 42 protrudes from the component main body 41 so as to be easily gripped by the gripping mechanism 3. The gripped portion 42 has a rectangular plate shape and is connected at an end surface thereof to one of main surfaces of the component main body 41.

The second component 5 corresponds to a substantially rectangular parallelepiped-shaped component main body 51 with a recess 52 formed therein. The recess 52 is formed to receive the component main body 41 of the first component 4.

Figure 5:
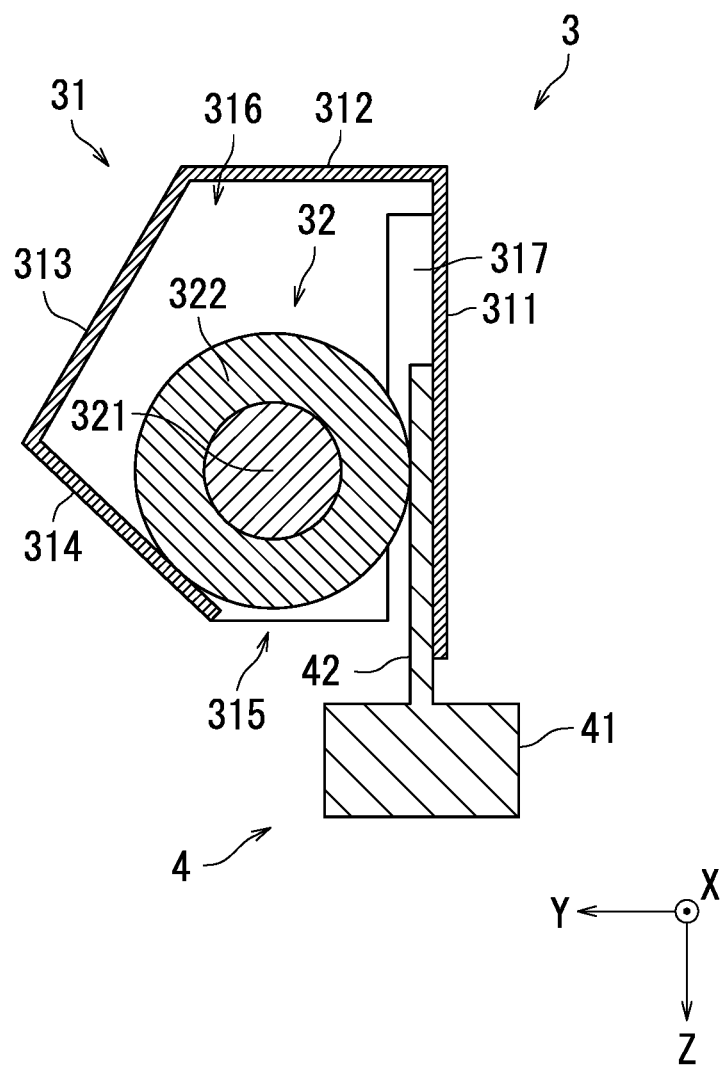
FIG. 5 is a cross-sectional view describing operation of the gripping mechanism.

Next, operation of the gripping mechanism 3 is described with reference to FIG. 5. FIG. 5 is a cross-sectional view describing the operation of the gripping mechanism 3.

As illustrated in FIG. 5, the gripping mechanism 3 grips the first component 4 between the outer surface of the gripping roller 32 and the inner surface of the holder 31 through action of gravity acting on the gripping roller 32. Specifically, in a gripped state illustrated in FIG. 5, the gripped portion 42 is gripped between the outer surface of the covering section 322 and the inner surface of the back plate 311 by appropriate friction force. Due to compressive deformation of the covering section 322, a contact area of the covering section 322 with the gripped portion 42 becomes larger than in a case where the covering section 322 is made from an inelastic material, thereby realizing great gripping force.

The following describes operation of the assembly apparatus 100 with reference to FIGS. 1 to 5.

In a first process, the robot 1 moves the gripping mechanism 3 to a location where the first component 4 is stored as illustrated in FIG. 1. Subsequently, the robot 1 adjusts the posture of the gripping mechanism 3 so that the gripped portion 42 and the back plate 311 are parallel to each other, and then moves the gripping mechanism 3 in the positive Z-axis direction toward the first component 4. The gripped portion 42 enters the holder 31 through the opening 315 and ascends in the holder 31 while pushing aside the gripping roller 32. When the upper end of the gripped portion 42 reaches a point higher than the center of the gripping roller 32, movement of the gripping mechanism 3 stops. As a result, the gripped state illustrated in FIG. 5 is realized.

In a second process, the robot 1 moves the gripping mechanism 3 in the negative Z-axis direction. The robot 1 further moves the gripping mechanism 3 to transport the first component 4 to a location directly above the second component 5 as illustrated in FIG. 1. The gripped portion 42 remains gripped between the outer surface of the covering section 322 and the inner surface of the back plate 311.

In a third process, the robot 1 moves the gripping mechanism 3 in the positive Z-axis direction. As a result, the first component 4 is fitted into the second component 5. Note that in a configuration in which the gripped portion 42 may slip or move between the outer surface of the covering section 322 and the inner surface of the back plate 311 in fitting, an auxiliary means may be added for pushing the first component 4 in the positive Z-axis direction. In any case, the gripped state illustrated in FIG. 5 is maintained at least until just before fitting.

In a fourth process, the robot 1 moves the gripping mechanism 3 in the positive X-axis direction. The gripped portion 42 slides between the outer surface of the covering section 322 and the inner surface of the back plate 311 and passes further through the cutout 317. As a result, gripping of the first component 4 by the gripping mechanism 3 is released. The first component 4 remains fitted in the second component 5.

In a fifth process, the robot 1 moves the gripping mechanism 3 in the negative Z-axis direction to return the gripping mechanism 3 to the original position thereof for the next operation.

Note that in order to prevent the first component 4 in the gripped state illustrated in FIG. 5 from falling off, a rib extending in the X-axis direction may be provided in the vicinity of the upper edge of one of two main surfaces of the gripped portion 42 located on the side of the gripping roller 32. Through operation of the rib, the gripped portion 42 can be prevented from sliding and moving in the positive Z-axis direction between the outer surface of the covering section 322 and the inner surface of the back plate 311.

Figure 6:
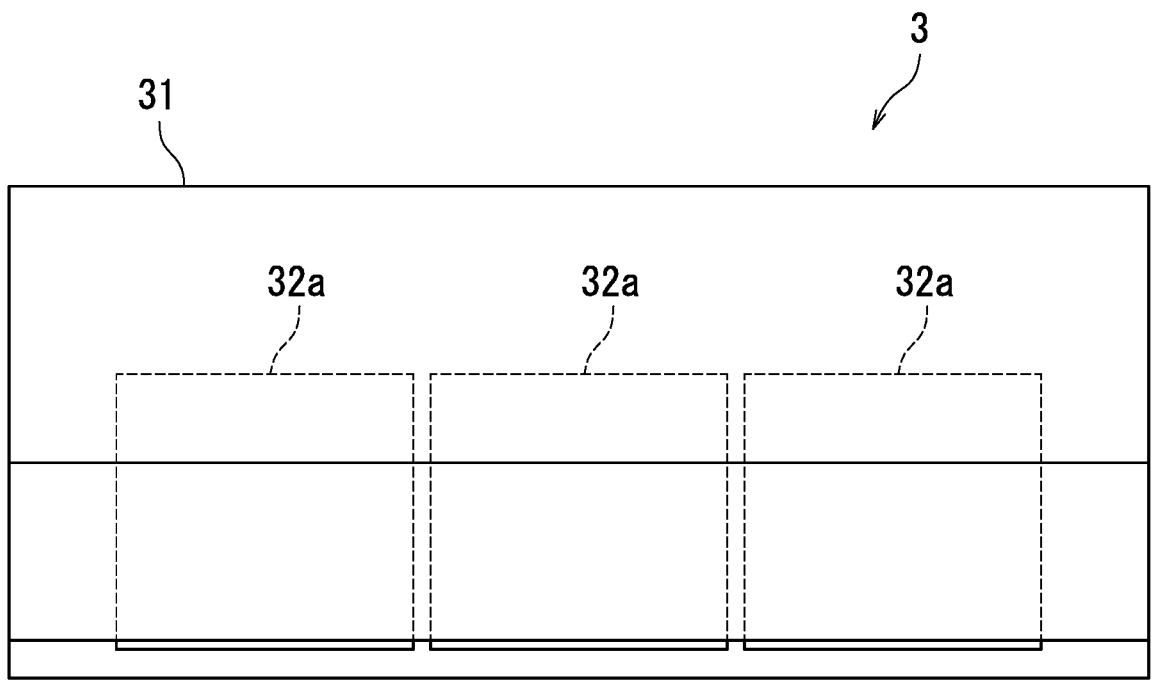
FIG. 6 is a front view of a variation of the gripping mechanism.
Figure 6:
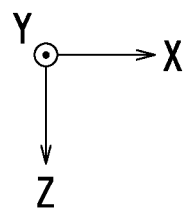

Next, a variation of the gripping mechanism 3 is described with reference to FIG. 6. FIG. 6 is a front view of the variation of the gripping mechanism 3.

The gripping mechanism 3 illustrated in FIG. 6 differs from the gripping mechanism 3 illustrated in FIG. 2 in that the holder 31 houses a plurality of gripping rollers 32a. When the gripping rollers 32a are differentiated from each other in weight, a plurality of gripping forces can be used. Furthermore, the respective gripping rollers 32a may have circumferential surfaces with different friction coefficients.

Figure 7:
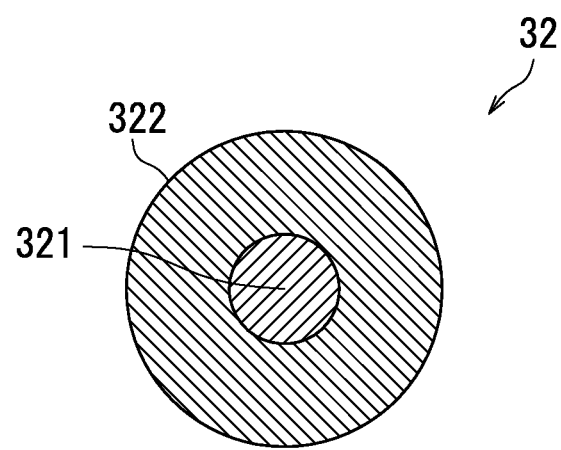
FIG. 7 is a cross-sectional view of an example of weight adjustment of a gripping roller.

Next, weight adjustment of a gripping roller 32 is described with reference to FIG. 7. FIG. 7 is a cross-sectional view of an example of weight adjustment of the gripping roller 32.

The gripping roller 32 illustrated in FIG. 7 differs from the gripping roller 32 illustrated in FIG. 3 in that the diameter of the core 321 is reduced. Assuming that the materials of the core 321 and the covering section 322 and the total diameter of the gripping roller 32 are the same, the smaller the diameter of the metal core 321 is, the smaller the weight of the gripping roller 32 is. Conversely, the greater the diameter of the metal core 321 is, the greater the weight of the gripping roller 32 is. The weight of the gripping roller 32 can also be adjusted by changing the material(s) of either or both the core 321 and the covering section 322.

Figure 8:
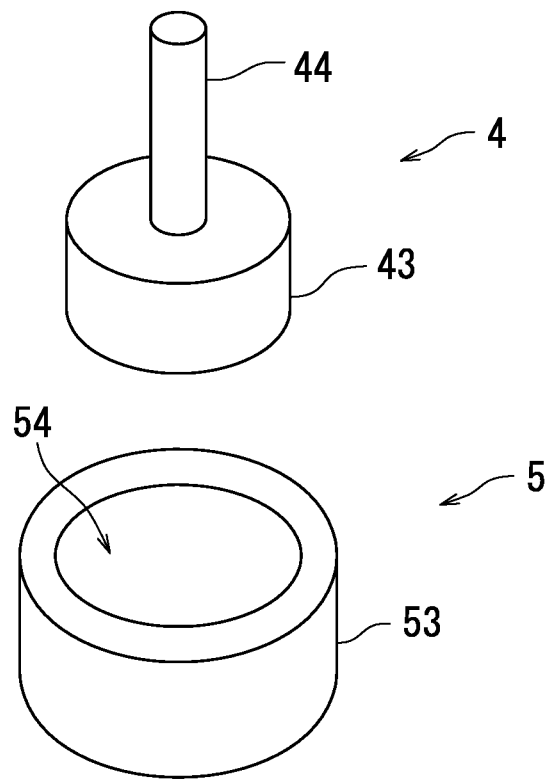
FIG. 8 is a perspective view of a variation of the component.

Next, a variation of the first component 4 is described with reference to FIG. 8. FIG. 8 is a perspective view of the variation of the first component 4.

As illustrated in FIG. 8, the first component 4 includes a component main body 43 and a gripped portion 44. The component main body 43 has a substantially columnar shape. The gripped portion 44 protrudes from the component main body 43 so as to be easily gripped by the gripping mechanism 3. The gripped portion 44 has a rod shape with a circular cross section and is connected at an end surface thereof with one of main surfaces of the component main body 43.

The second component 5 corresponds to a substantially columnar-shaped component main body 53 with a recess 54 formed therein. The recess 54 receives insertion of the component main body 43 of the first component 4.

The gripping mechanism 3, of which operation has been described with reference to FIG. 5, can securely grip the gripped portion 44 between the outer surface of the covering section 322 and the inner surface of the back plate 311 even when the gripped portion 44 is rod-shaped as illustrated in FIG. 8.

Figure 9:
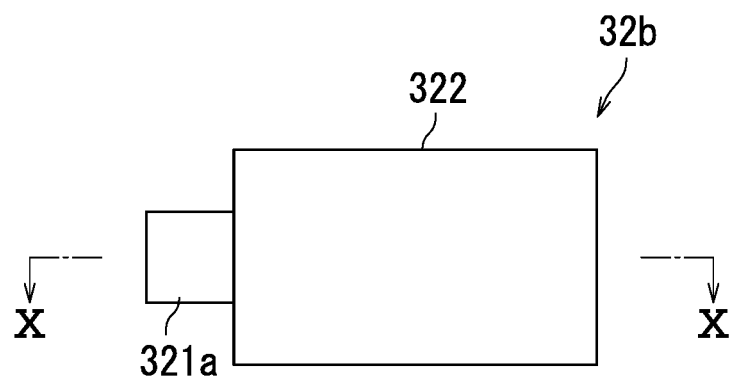
FIG. 9 is a front view of a gripping roller according to a variation.
Figure 10:
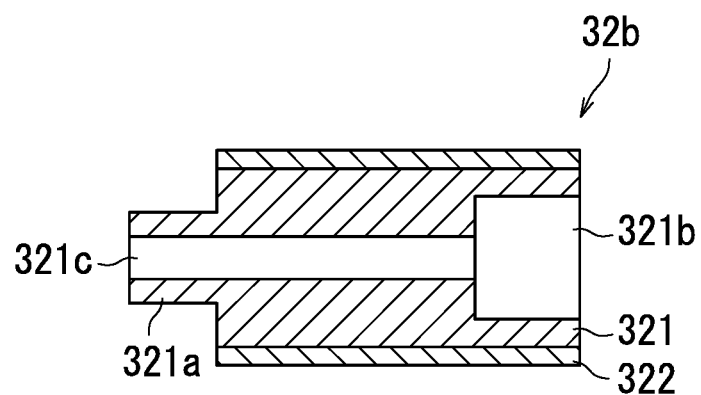
FIG. 10 is a cross-sectional view taken along the line X-X in FIG. 9.

Next, a gripping roller 32b according to a variation is described with reference to FIGS. 9 and 10. FIG. 9 is a front view of the gripping roller 32b according to the variation. FIG. 10 is a cross-sectional view taken along the line X-X in FIG. 9.

As illustrated in FIG. 10, the gripping roller 32b includes a cylindrical core 321 and a covering section 322 that covers the circumferential surface of the core 321. Materials of the core 321 and the covering section 322 are the same as those of the gripping roller 32 illustrated in FIG. 3.

The core 321 has a cylindrical projection 321a at one end on a center line thereof and a recess 321b with a circular cross section at the other end on the center line thereof. The core 321 further has a through hole 321c along the center line thereof.

The gripping roller 32b illustrated in FIGS. 9 and 10 is referred to as a "first roll", and another gripping roller 32b having the same configuration as the first roll is referred to as a "second roll". As a result of the projection 321a of the first roll being inserted into the recess 321b of the second roll, the first roll and the second roll are connected to each other. The outer diameter of the projection 321a is smaller than the inner diameter of the recess 321b to the extent that the center lines of two adjacent gripping rollers 32b can intersect with each other with the projection 321a of one of the adjacent gripping rollers 32b inserted in the recess 321b of the other of the adjacent gripping rollers 32b. Three or more gripping rollers 32b can be connected in series in a likewise manner.

Figure 11:
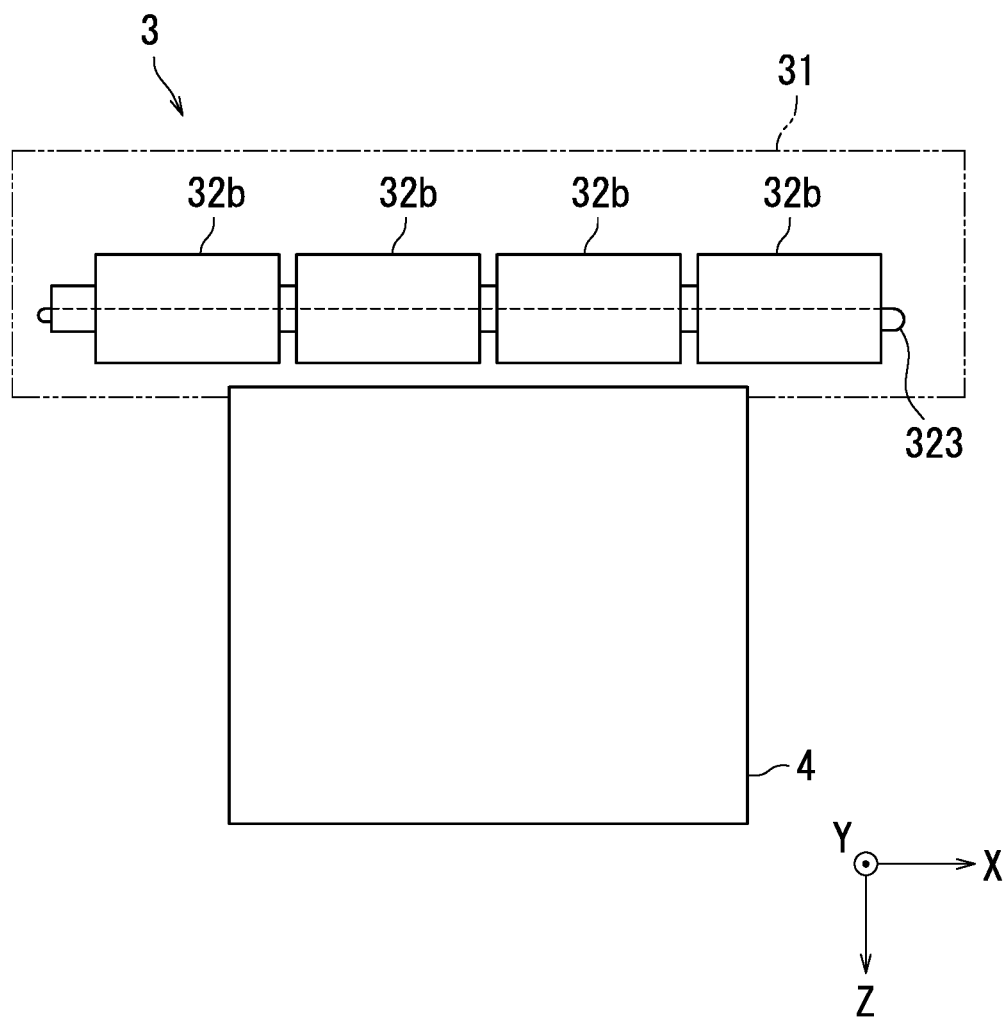
FIG. 11 is a front view of a gripping mechanism including a plurality of gripping rollers according to a variation.

Next, a gripping mechanism 3 including the gripping rollers 32b in the variation is described with reference to FIGS. 9, 10, and 11. FIG. 11 is a front view of the gripping mechanism 3.

As illustrated in FIG. 11, the gripping mechanism 3 includes a holder 31 and a plurality of gripping rollers 32b connected in series. The longitudinal direction of the holder 31 corresponds to the X-axis direction. The shape and the material of the holder 31 are the same as those of the holder 31 illustrated in FIGS. 2 and 3, and detailed description thereof is omitted.

The gripping rollers 32b connected in series are arranged in the holder 31 so that the center lines thereof coincide with an X axis. The gripping rollers 32b share a restricting section 323 that restricts movement of the gripping rollers 32b to prevent each projection 321a from coming out of a corresponding one of the recesses 321b. The restricting section 323 is for example a string, a wire, or a spring that passes through the through holes 321c of all of the gripping rollers 32b. The restricting section 323 has opposite ends that are fixed to gripping rollers 32b located at the opposite ends of the series.

The gripping mechanism 3 in the example illustrated in FIG. 11 includes four gripping rollers 32b. The gripping mechanism 3 is trying to grip a rectangular plate-shaped first component 4. The first component 4 is supported so that a main surface thereof is parallel to the ZX plane and two of the four sides of the main surface are parallel to the X axis. The first component 4 has a dimension in the X-axis direction that is slightly longer than the total length of two of the gripping rollers 32b.

Figure 12:
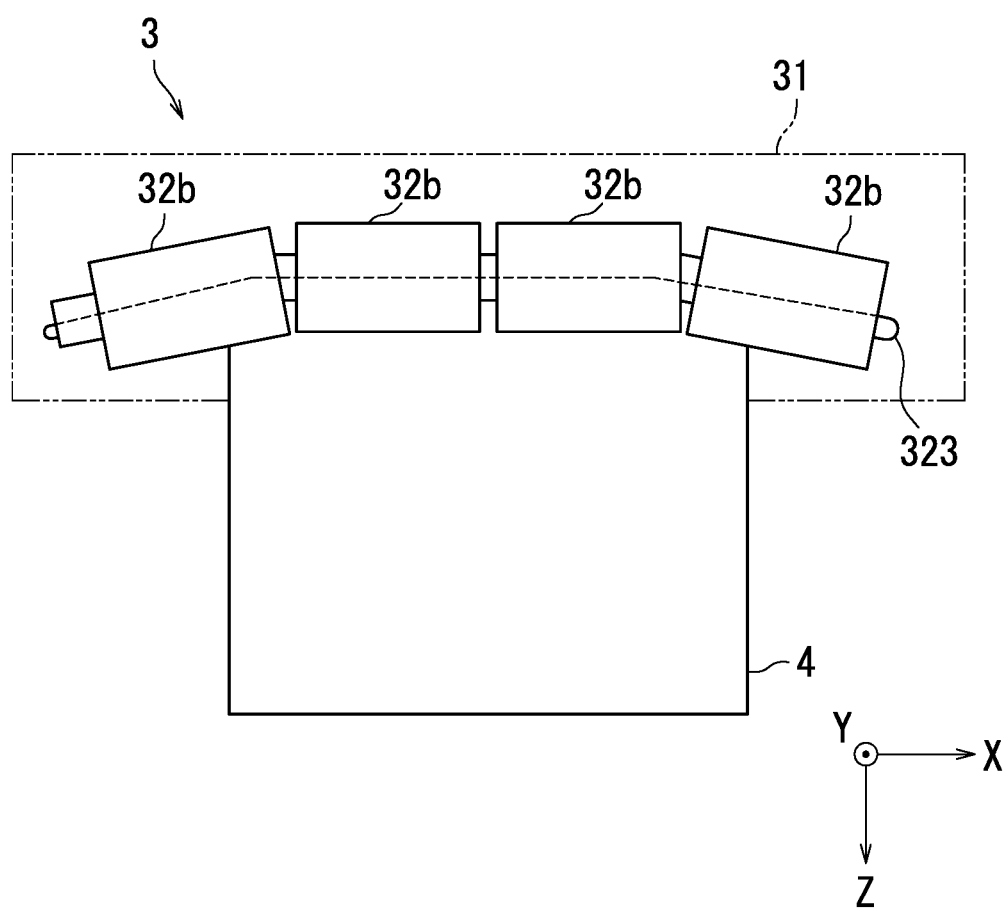
FIG. 12 is a front view of a state in which the gripping mechanism in FIG. 11 grips an object.

Next, the posture of each gripping roller 32b of the gripping mechanism 3 gripping the first component 4 is described with reference to FIG. 12. FIG. 12 is a front view of a state in which the gripping mechanism 3 grips the first component 4.

When the gripping mechanism 3 moves in the positive Z-axis direction relative to the first component 4, the upper edge of the first component 4 enters the holder 31. The first component 4 ascends in the holder 31 while pushing aside the four gripping rollers 32b. As a result, the gripping mechanism 3 grips the first component 4 between the inner surface of the holder 31 and the outer surfaces of two of the gripping rollers 32b located in the middle. Although the center lines of the other two gripping rollers 32b located at the respective opposite ends incline relative to the two gripping rollers 32b located in the middle, the projections 321a will not come out of the corresponding recesses 321b due to the operation of the restricting section 323. As such, the gripping rollers 32b are prevented from standing upright in the holder 31.

When gripping of the first component 4 by the gripping mechanism 3 is released, the posture of the four gripping rollers 32b returns to the state illustrated in FIG. 11 from the state illustrated in FIG. 12.

Note that the side plates 316 (see FIG. 3) of the holder 31 may restrict movement of the gripping rollers 32b in place of the string, the wire, or the spring that is the restricting section 323. In this case, the side plates 316 of the holder 31 function as a restricting section 323 that prevents the projections 321a from coming out of the recesses 321b.

According to the embodiment, a gripping mechanism 3 that does not require power is constituted by only the holder 31 and the gripping roller 32 (or gripping rollers 32a or 32b). As a result, a low-cost gripping mechanism 3 that is not prone to failure can be realized.

Furthermore, in the gripping mechanism 3 including the gripping rollers 32a each with a short dimension in the respective axial directions as illustrated in FIG. 6, only gripping rollers 32a of which number corresponds to an insertion position and the dimension in the X-axis direction of the gripping target are raised by the gripping target. As a result, power necessary for inserting the gripping target can be reduced as compared to a case in which the gripping mechanism 3 includes the long gripping roller 32 as illustrated in FIG. 2.

Furthermore, as illustrated in FIGS. 11 and 12, the gripping mechanism 3 including the gripping rollers 32b connected in series can prevent the gripping rollers 32b from standing upright. In addition, the gripping mechanism 3 can maintain gripping force and followability of the gripping rollers 32b along the gripping target regardless of the insertion position and the dimension in the X-axis direction of the gripping target.

The description of the above embodiment is a preferable embodiment of the present invention, and therefore may include various preferable technical limitations. However, the technical scope of the present invention is not limited to the embodiment unless specifically described as such. That is, the elements of configuration in the above embodiment may be appropriately replaced with existing elements of configuration and the like, and a number of variations including combinations with other existing elements of configuration are possible. The description of the above embodiment does not limit the content of the invention described in the claims.

For example, the gripping mechanism 3 is not limited to being used for the assembly apparatus 100. The gripping mechanism 3 can be exploited in conveyor apparatuses.

INDUSTRIAL APPLICABILITY

The present invention is applicable to fields of gripping mechanisms, assembly apparatuses, and components.

The invention claimed is:

1. A gripping mechanism comprising:
a roller; and
a frame that houses the roller, wherein
the gripping mechanism grips an object between an outer surface of the roller and an inner surface of the frame through action of gravity acting on the roller,
the roller includes a plurality of rotors connected in series and a restricting section,
each of the rotors includes a projection at one of ends on a center line thereof and a recess at another one of the ends on the center line thereof,
the projection of one rotor of the rotors is inserted in the recess of another rotor of the rotors that is adjacent to the one rotor,
the restricting section prevents the projection from coming out of the recess, and
the restricting section supports the rotors to allow the center lines of rotors, of the rotors, located at respective opposite ends of the series to incline relative to the center line of a rotor, of the rotors, located in middle.

2. The gripping mechanism according to claim 1, wherein the roller includes:
a core that is cylindrical or columnar in shape; and
a covering section that is an elastic body covering a circumferential surface of the core.

3. The gripping mechanism according to claim 2, wherein the covering section has a circumferential surface with a friction coefficient greater than a friction coefficient of the circumferential surface of the core.

4. The gripping mechanism according to claim 1, wherein an outer diameter of the projection of each of adjacent two rotors of the rotors is smaller than an inner diameter of the recess thereof to an extent that center lines of the adjacent two rotors can intersect with each other with the projection of one of the adjacent two rotors inserted in the recess of the other of the adjacent two rotors.

5. The gripping mechanism according to claim 1, wherein the frame includes two plate-shaped portions that support weight of the roller, and
an opening through which insertion of the object is received is defined between the two plate-shaped portions.

6. The gripping mechanism according to claim 1, wherein each of the rotors further has a through hole,
the restricting section passes all of the through holes of the rotors, and
the restricting section has opposite ends that are fixed to the rollers located at the respective opposite ends of the series.

7. An assembly apparatus comprising:
the gripping mechanism according to claim 1; and
a driving mechanism configured to move the gripping mechanism relative to the object.

8. A component comprising:
a component main body; and
a gripped portion that protrudes from the component main body to serve as the object to be gripped by the gripping mechanism according to claim 1.

* * * * *